Patented Mar. 23, 1943

2,314,548

UNITED STATES PATENT OFFICE 2,314,548

FILTER PAPER AND THE METHOD OF ITS MANUFACTURE AND USE

Leslie A. McClintock, Worcester, Mass., assignor to Raymond H. Goodale, Worcester, Mass.

No Drawing. Application June 16, 1941,
Serial No. 398,234

9 Claims. (Cl. 23—253)

This invention relates to a filter paper and the method of its manufacture and use for the separation of a liquid from solids suspended in it simultaneously with precipitation of an ingredient in the liquid by a reagent on the paper.

It has been proposed heretofore to pass untreated urine as received from the patient through a filter paper impregnated with sulphosalicylic acid and examine the filtrate for precipitated albumin. Such a paper is satisfactory if used within several weeks after preparation, but after a few months the acid causes brittleness which interferes with its use. It is an important object of my invention to add a neutralizer to the acid for the purpose of checking the action of the acid on the paper, and provide the paper with means for absorbing the neutralizer and thus release the acid when the paper is to be used. The free acid then acts to precipitate any albumin which may be in the urine.

It is another object of my invention to treat part of the paper with sulphosalicylic acid which has been ammoniated to prevent acid action on the paper, and treat another part of the paper with tartaric acid. In the dry state the sulphosalicylic acid does not attack the paper because of the ammonia, and the tartaric acid is too weak to injure the paper, therefore the paper may be kept for months without suffering deterioration. When used to test for albumin, the liquid of the urine dissolves the chemicals on the paper and the tartaric acid takes the ammonia from the neutralized sulphosalicylic acid, freeing the latter so that it can precipitate albumin from the urine which passes through the paper.

It is a further object of my invention to dip the paper in the neutralized and weak acid solutions in such a way as to prevent overlapping of the differently treated parts of the paper. Should overlapping occur the reagent acid would be released in the zone of overlap with resultant injury to the paper. In dipping I make allowance for absorption of the solutions by the paper, thus avoiding overlapping.

More broadly, the invention aims to provide a stable filter paper part of which is impregnated with a neutral compound including a reagent and a neutralizer for it, and another part of which is impregnated with a reactor capable of counteracting the neutralizer but normally ineffective to do so. The paper is folded and opened to form the usual inverted cone, after which the liquid to be tested is poured into it and dissolves the neutralized reagent and the reactor, whereupon the latter unites with the neutralizer and frees the reagent, which then precipitates from the liquid any ingredient dissolved in it and responsive to the reagent.

The following description sets forth a convenient procedure for carrying my invention into effect and attaining the foregoing and other objects.

For the purposes of my invention I may employ any of several commercial filter papers, such as the four inch circular paper made by Reeve Angel & Company. These papers are sold in packages of 100 each and in practice I fasten several packages together and treat them as a unit. Since the treatment of the unit is essentially the same as though one paper were being treated, I will describe the preparation of a single paper and it is to be understood that the procedure for its treatment will be followed when preparing several packages.

The paper is dipped edge on until slightly less than half of it is immersed in a 20% solution of sulphosalicylic acid to which has been added concentrated ammonia in sufficient amount to more than neutralize the acid. After dipping, the solution will creep along the paper until about half of the paper is moist. When partly dried the paper is inverted and most of the remaining dry part dipped into a one half saturated solution of tartaric acid. As before, the latter acid will creep along the paper but will not reach the previously dipped part unless it has been dipped too deeply into the tartaric acid. Overlapping is thus avoided and the paper can be kept for months without deterioration.

I have found that overlapping is not very harmful, especially if the paper is used within several weeks after preparation, but I prefer to avoid it, and this can be done, when using a four inch paper, by dipping about one and three-quarter inches of the paper into the solutions. It is preferable to have a narrow untreated strip extending across the paper rather than risk overlapping. The amount of dipping which will prevent overlapping will vary with different papers, but can easily be determined experimentally for various papers.

When treating packages of papers I find it preferable to separate the several sheets, otherwise the fumes of the ammonia are likely to neutralize part or all of the tartaric acid. The papers should be laid on a dry, non-absorbent surface to permit full strength absorption of the solutions. When sufficient time elapses between the two dippings, to allow the ammonia to evaporate this precaution need not be taken.

The papers, when dry, are ready for immediate use or can be stored and used any time during an interval of several months following their preparation. The neutralized ammonium sulphosalicylate will not attack that part of the paper impregnated with it, and the tartaric acid is too weak to injure the paper. It is for these reasons that the papers can be kept for months without losing their usefulness.

In use, the paper will be folded along a diameter which need not necessarily follow the line of demarcation between the treated areas, will be folded again and then opened to form an inverted cone, as is usual practice. The paper will then be set in a test cup point down and the untreated urine as received from the patient poured into it. The ammonium sulphosalicylate is dissolved by the liquid of the urine, as is also the tartaric acid, but the latter has such a strong affinity for ammonia that it breaks up the ammonium sulphosalicylate to form ammonium tartrate, thereby releasing sulphosalicylic acid. As filtering proceeds the phosphates and other solids suspended in the urine will remain on the paper while the cleared urine drips into the cup. The sulphosalicylic acid also drips into the cup and will coagulate any albumin present to form a visible precipitate in the bottom of the cup. The extent of the albumin cloud in the filtrate will give an approximate indication of the amount of albumin in the urine.

The ammonium tartrate also passes into the cup but has no deterrent effect on the action of the reagent acid in precipitating the albumin. By using enough tartaric acid all of the ammonia will be absorbed and little or none remain to interfere with the action of the reagent. Even though the several acids be not exactly balanced, enough sulphosalicylic acid will be released to give a satisfactory test.

While ammonium sulphosalicylate has been mentioned, other compounds, such as sodium phosphotungstate or ammonium phosphomolybdate can be used in its place with any one of several diabasic organic acids, such as oxalic or citric, instead of tartaric acid. It is sufficient if the reagent used to precipitate the albumin be held inactive by a neutralizer associated with it on one part of the paper, while the other part of the paper carries a reactor which, when ionized by solution with the urine, comibnes with the neutralizer to free the reagent.

Although detection of albumin in urine has been described as a specific embodiment of my invention, the procedure set forth herein relates more generally to a paper the injury of which by a strong reagent on it is prevented by combining the reagent with a neutralizer having an affinity for a reactor harmless to and on another part of the paper. The filtering capacity of the paper can be used to separate suspended matter from sought ingredients in the liquid and precipitable by the reagent, and the filtrate which passes through the paper will show the ingredient precipitated by the reagent. The neutralizer and reactor should be so chosen and proportioned that the compound which they form, or any free parts of them, will not effectively inhibit precipitation of the ingredient by the reagent.

From the foregoing it will be seen that I have provided a paper part of which carries a neutralizer reagent and another part of which carries a reactor to combine with the neutralizer and release the reagent to enable the latter to precipitate an ingredient from a liquid which has been cleared by filtering through the paper. Furthermore, the paper is so dipped as to avoid overlapping zones of the neutralized reagent and reactor. Also, the invention has a specific application to the analysis of urine, in which case part of the paper is treated with an albumin precipitating reagent, such as sulphosalicylic acid, or the like neutralized by an alkali, such as ammonia, while another part of the paper is treated with a weak acid, such as tartaric, capable of releasing the reagent by combining with the neutralizer. The result of the test is found in the filtrate which has passed through the paper, the latter having held back solids in the liquid under test. Again, I have set forth methods for preparing the paper and also using it to attain simultaneous clearing of a solution or liquid and precipitation of an ingredient dissolved therein.

What I claim is:

1. A dried filter paper for the determination of albumin in urine prepared to prevent deterioration when dried and stored, part of the paper being impregnated with ammonium sulphosalicylate and another part of the paper being impregnated with tartaric acid, said parts being separated by an unimpregnated zone but so close to each other that neither part can be completely wetted without wetting the other part.

2. A dried filter paper for the determination of albumin in urine prepared to prevent deterioration when dried and stored, part of the paper being impregnated with sulphosalicylic acid neutralized by ammonia and another part being impregnated with tartaric acid, said parts being separated by an unimpregnated zone but so close to each other that neither part can be completely wetted without wetting the other part.

3. A dried filter paper for the determination of albumin in urine prepared to prevent deterioration when dried and stored, part of the paper having been dipped into a solution of approximately 20% of sulphosalicylic acid combined with a sufficient amount of ammonia to neutralize the acid, and another part of the paper having been dipped into a one half saturated solution of tartaric acid, said parts being separated by an unimpregnated zone but so close to each other that neither part can be completely wetted without wetting the other part.

4. The method of preparing a dry filter paper for the determination of albumin in urine so as to prevent deterioration of the paper when dried and stored, said method consisting in the following steps: neutralizing a sulphosalicylic acid solution with ammonia, dipping part of the paper in the solution, dipping another part of the paper in a solution of tartaric acid, the dipping being done in such a manner that the impregnated parts of the paper are separated by an unimpregnated part of the paper but are so close to each other that complete wetting of one part necessarily causes wetting of the other part, and drying the paper thus treated.

5. The method of preparing a filter paper for the determination of albumin in urine so as to prevent deterioration of the paper when dried and stored, said method consisting in the following steps: neutralizing a sulphosalicylic acid solution with ammonia, dipping part of the paper in the neutralized solution, removing the paper from the solution and allowing the latter to moisten the maximum area of the paper which it can penetrate, then dipping part of the remainder of the paper in a tartaric acid solution to points spaced from the previously moistened part of the paper sufficiently to prevent penetration by the tartaric acid into the area moistened by the sulphosalicylic acid solution, the dipping being done in such a manner that the impregnated parts of the paper are separated by an unimpregnated part of the paper but are so close to each other that complete wetting of one part necessarily causes wetting of the other part, and drying the paper thus treated.

6. A dry filter paper for the determination of albumin in urine prepared to prevent deterioration of the paper when dried and stored, part of the paper being impregnated with an alkaline salt of an acid capable of precipitating albumin from urine, and another part of the paper being impregnated with a diabasic organic acid which will decompose the salt to free the albumin precipitating acid and combine with the alkali which is freed by the decomposition of the alkaline salt, said parts of the paper being separated by an unimpregnated zone of the paper but being so close to each other that neither part can be completely wetted without wetting the other part.

7. A dry filter paper for the determination of albumin in urine prepared to prevent deterioration of the paper when dried and stored, part of the paper being impregnated with a salt of an acid which precipitates albumin from urine, said salt being selected from the group consisting of sodium and ammonium, and another part of the paper being impregnated with a diabasic organic acid which will decompose the salt to free the albumin precipitating acid, said parts of the paper being separated by an unimpregnated part of the paper but being so close to each other that complete wetting of either part necessarily causes wetting of the other part.

8. The method of preparing a dry filter paper for the determination of albumin in urine in such a manner as to prevent deterioration of the paper when it is dried and stored, said method consisting in the following steps: forming an alkaline salt with an acid which precipitates albumin from urine, dipping part of the paper into said salt, dipping another part of the paper into a diabasic organic acid capable of decomposing the salt, and drying the paper, the dipping of the parts of the paper being done in such a manner that the impregnated parts of the paper are separated by an unimpregnated part of the paper but are so close to each other that complete wetting of either part necessarily causes wetting of the other part.

9. The method of preparing a dry filter paper for the determination of albumin in urine in such a manner as to prevent deterioration of the paper when it is dried and stored, said method consisting in the following steps: forming a salt of an acid which precipitates albumin from urine, said salt being selected from the group consisting of sodium and ammonium, dipping part of the paper into the salt, dipping another part of the paper into a diabasic organic acid which is capable of decomposing the salt to free the albumin precipitating acid, and drying the paper, the dipping being done in such a manner that the impregnated parts of the paper are separated by an unimpregnated part but are so close to each other that complete wetting of one part necessarily causes wetting of the other part.

LESLIE A. McCLINTOCK.